July 8, 1924.  F. W. A. SENKEL  1,500,278
SOLDERING IRON
Filed Sept. 14, 1923
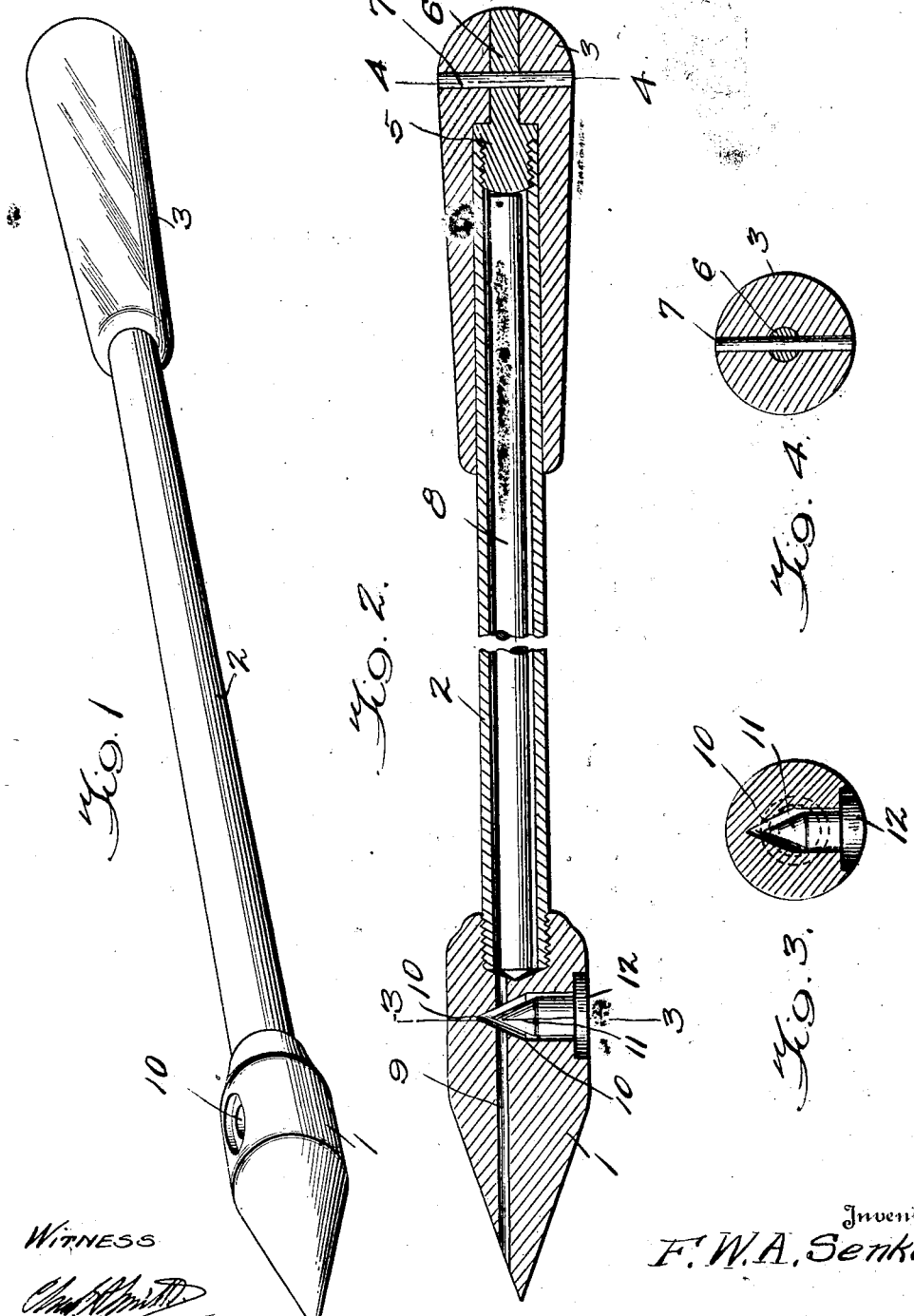
Inventor
F. W. A. Senkel
By Richard B. Owen.
Attorney Patented July 8, 1924.

1,500,278

UNITED STATES PATENT OFFICE.

FREDERICK W. A. SENKEL, OF BALTIMORE, MARYLAND.

SOLDERING IRON.

Application filed September 14, 1923. Serial No. 662,700.

*To all whom it may concern:*

Be it known that FREDERICK W. A. SENKEL, citizen of the United States, residing at Baltimore, in the county of Baltimore City and State of Maryland, has invented certain new and useful Improvements in Soldering Irons, of which the following is a specification.

The present invention relates to a soldering iron and has for its principal object to provide a structure for feeding solder to the iron as needed.

Another object of the invention is to provide a soldering iron having a simple and efficient structure, one which is reliable, inexpensive to manufacture, durable, easily manipulated, and well adapted for the purpose for which it is designed.

With the above and other numerous objects in view which will appear as the description progresses the invention resides in the novel features of construction, and in the combination and arrangement of parts as will be hereinafter more fully described and claimed.

In the drawings:

Figure 1 is a perspective view of the soldering iron embodying my invention;

Figure 2 is a longitudinal section therethrough;

Figure 3 is a transverse section taken substantially on the line 3—3 of Figure 2, and Figure 4 is a transverse section taken substantially on the line 4—4 of Figure 2.

Referring to the drawings in detail it will be seen that the soldering iron includes a head 1, a container 2, and a handle 3. The container 2 is preferably in the form of a tube threadedly engaged with the head. The handle 3 is preferably made of wood or other non-conducting material and in the present instance is provided with a bore in which is positioned a nut 5 having a shank 6 extended therefrom so that a pin 7 may be passed through the handle 3 and the shank for holding the nut in place. This nut 5 threadedly engages the container 2. A bar of solder 8 may be disposed in the container 2 and fed to the head 1. This head 1 is provided with a conduit 9 communicating with the interior of the container 2 and the solder is adapted to flow through the conduit when the head 1 has been heated to the proper temperature. A valve mechanism is associated with the head and conduit 9. The head 1 is provided with a valve seat 10 extended across the conduit 9 and a valve 11 is mounted in the head for association with the seat. Thus the valve will be in an open position when the iron is disposed as in Figure 2 but should it be rotated through an angle of one hundred and eighty degrees it will be seen that this valve will move to a closed position thereby preventing the flow of solder through the conduit 9. A disk 12 is disposed in the head so as to prevent the valve from dropping out of the head when positioned as shown in Figure 2.

From the above description it will be seen that this soldering iron is in reality a fountain soldering iron and that the solder will be fed through the conduit 9 when the same has been heated to the desired degree of temperature and this flow of solder may be readily cut off by merely turning the iron so that the valve 11 closes. It is evident that numerous changes in the details of construction and in the combination and arrangement of parts may be made and I do not wish to be limited to the construction herein shown except as hereinafter claimed.

What is claimed is:

1. A soldering iron of the class described including a head, a container connected to the head, said head provided with a conduit communicating with the container, said head also provided with a valve seat extending across the conduit, a valve movable in the head adapted to be seated on the valve seat by gravity whereby the flow of solder from the container through the conduit may be regulated by turning the soldering iron in the manner and for the purpose specified.

2. A soldering iron of the class described including a head, a solder container associated with the head, said head provided with a longitudinally extending conduit in communication with the container, and a valve movable in the head and capable of extending across the conduit therein to stop the flow of solder whereby said iron may be rotated to open or close the valve all in the manner and for the purpose specified.

In testimony whereof I affix my signature in presence of two witnesses.

FREDERICK W. A. SENKEL.

Witnesses:
 CORBIN G. LONGLEY,
 WILLIAM WELLS.